April 7, 1964  C. J. ZINKEL, JR  3,128,106
LOAD TIE-DOWN ASSEMBLY
Filed March 14, 1961
Fig. 1.
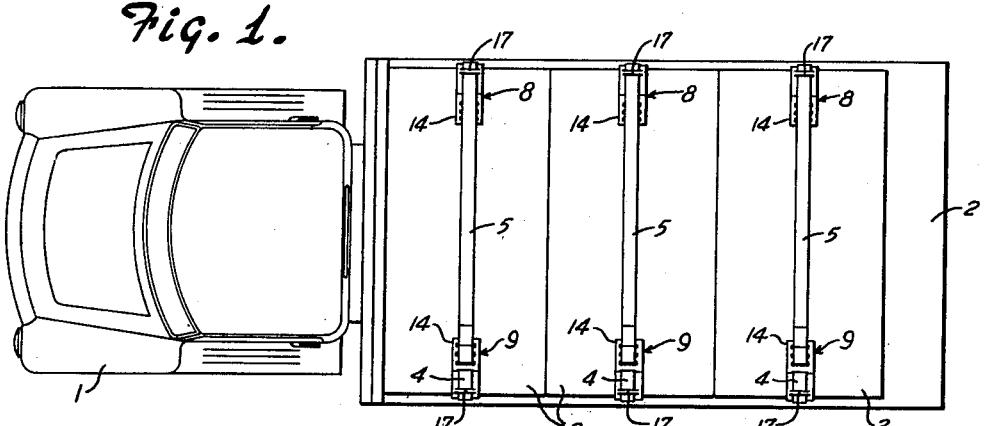
Fig. 2.
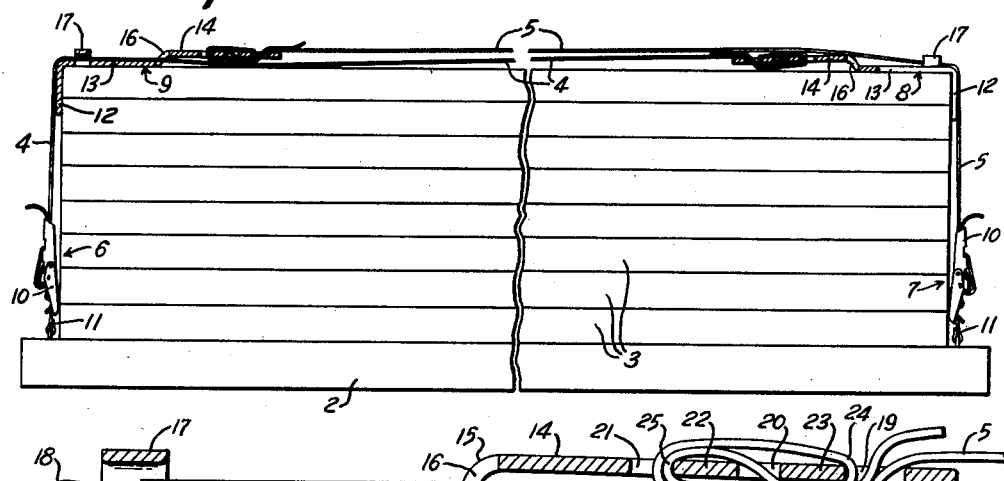
Fig. 3.
Fig. 4.
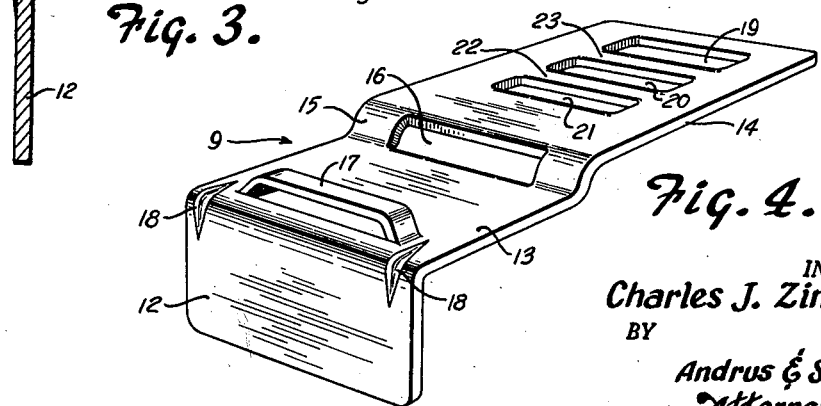
INVENTOR.
Charles J. Zinkel, Jr.
BY
Andrus & Starke
Attorneys United States Patent Office 3,128,106
Patented Apr. 7, 1964

3,128,106
LOAD TIE-DOWN ASSEMBLY
Charles J. Zinkel, Jr., Milwaukee, Wis., assignor to Lakeview Manufacturing Corporation, Milwaukee, Wis., a corporation of Wisconsin
Filed Mar. 14, 1961, Ser. No. 95,617
8 Claims. (Cl. 280—179)

This invention relates to a load tie-down assembly for securing a load to a movable support and particularly to a tie-down assembly for securing vehicle mounted loads which tend to shift laterally as the vehicle turns a curve or corner.

Building products such as boards, plywood sheathing, plasterboard and like elements are often transported by stacking of the individual elements into stacks upon a flat bed of a truck or other suitable conveyance means. Encircling straps, chains, or the like are secured to the bed and passed over the stack to securely tie down and clamp the load against movement during the transporting thereof. Paper stacks and boxes may also be similarly secured in place for movement. For example, the long expired United States Patent 1,003,108 to Hinrichs illustrates a cable clamping means for lumber and the like.

During the transporting, the individual elements in the load tend to shift laterally as the vehicle turns a corner or a curve because of the centrifugal forces on the stacks. The shifting usually begins with the uppermost boards or sheets in the stack creeping sideways, and if the force is sufficiently great the complete load shifts as the vehicle turns the corner and the load does not return to the normal position. The offsetting of the load reduces the effectiveness of the clamping and securing means and may result in loss or damage to the products being carried.

Similarly, rolls of paper and similar products are often transported on end and must be tied to the bed or a supporting platform. The tie-down means must also prevent lateral shifting.

The present invention is directed to securing means employing strap, rope, cable or any similar means for effectively securing a load to a movable support and particularly a stacked load of individual elements. The present invention provides and maintains an effective tie-down holding pressure and prevents lateral shifting of the load.

In accordance with the present invention, tying corner members are provided for engagement with the opposite top corners of the load. Each of the corner members include a side engaging clamping wall or leg and a top engaging clamping wall or leg. Flexible tying members such as straps, ropes, cables or the like are secured on opposite sides of the supporting platform and each extends upwardly and over the load. Each strap is tied to the top corner members opposite the side to which it is secured to the supporting platform. The straps are drawn up tightly and securely hold the load in place. Any tendency of the load to shift is positively prevented through the interaction of the corner member and the oppositely extending strap.

The corner members include means for threadedly receiving the opposite straps to establish longitudinal alignment of the flexible tying member and the corner members. The tying member overlaps and positively holds each opposite corner member on the corner of the load without longitudinal shifting of the load and straps to maintain the holding or clamping force on the load. Further, the overlapping straps are spaced from each other to prevent substantial adverse rubbing of one against the other due to wind, general fluttering and the like and thus assure a long life and reliable holddown.

The present invention thus provides a very simple and highly effective means for securing the load to a transporting device. The structure of the present invention can be readily and quickly attached and detached and can be easily adjusted for height and width of the load without any particular degree of skill required.

The drawing furnished herewith illustrates the best mode presently contemplated for carrying out the invention.

In the drawing:

FIG. 1 is a top elevational view of a truck having a flat bed carrying a plurality of stacks of plywood sheets;

FIG. 2 is an enlarged end view of FIG. 1;

FIG. 3 is an enlarged view illustrating the preferred method of securing a strap to a tie-down corner member constructed in accordance with the present invention; and FIG. 4 is a perspective view of a tie-down corner member shown in FIGS. 1–3.

Referring to the drawing and particularly to FIGS. 1 and 2, a conventional truck 1 is illustrated having a back flat bed 2 carrying a load of three longitudinally spaced and vertically superposed stacks of sheets 3. A pair of straps 4 and 5 are secured to the flat bed 2 on opposite sides of each stack of individual sheets 3 of plywood, metal, paper or the like by similar floor fasteners 6 and 7. Each pair of straps 4 and 5 is longitudinally aligned and extends upwardly along the adjacent side of the load and then over the load terminating in attachment to L-shaped corner members 8 and 9.

Each of the illustrated straps 4 and 5 is generally identical and is formed of any suitable flexible material such as the conventional web-type strap of suitable width and length to support the load 3. The straps 4 and 5 are secured to the members 8 and 9 and after placement over the load are attached to fasteners 6 and 7.

The fasteners 6 and 7 are similarly constructed and may be formed of any suitable construction for securely attaching the adjacent end of the straps 4 and 5 to the bed 2. The illustrated fasteners 6 and 7 include a buckle 10 secured to the bed 2 through a suitable strap and floor member 11. The buckle 10 is shown and fully described in United States Patent 2,825,109 to Nelson for releasably interconnecting the buckle to the end of a strap similar to straps 4 and 5. Generally, the illustrated buckle 10 is of a two-piece expandable variety allowing ready threading of the strap into the buckle 10. Closing of the buckles 10 tightens the straps 4 and 5 to securely hold the stack of sheets 3 in position.

Each of the illustrated corner members 8 and 9 is identically constructed and can be interchangeably positioned on the opposite top corners of the stack of plywood sheets 3. Each of the corner members 8 and 9 is generally an angle-shaped member formed of a heavy sheet metal and is somewhat wider than the straps 4 and 5. The corner members 8 and 9 are generally hook members and each includes a vertical leg or wall 12 which bears against the side of the uppermost sheets 3. A horizontal leg or wall 13 is integrally secured with the vertical wall 12 and rests on the uppermost sheet 3. An extension 14 on corner members 8 and 9 is vertically offset and projects forwardly from and generally parallel to the horizontal wall 13. The extension 14 is integrally interconnected with the forward edge of wall 13 by generally vertically extending connecting or junction legs 15 formed by offsetting of a sheet metal blank or the like. The spaced corner member extension 14 and the legs 15 define an opening 16 through which the strap 4 passes in corner member 9, as more fully described hereinafter. An inverted U-shaped guide 17 is also integrally formed in the horizontal wall 13 in spaced aligned relationship to the opening 16 by punching an opening in wall 13 and upsetting of the punched metal. Straps 4 and 5 are threaded through the guides 17 in the adjacent members 8 and 9 to align the members 8 and 9 and insure clamping thereof to the corners of the load. A pair of corner ribs 18 are also formed in the integral junction of walls 12 and 13 to strengthen the members 8 and 9.

The extension 14 includes three longitudinally and transversely extending slots 19, 20 and 21 defining an outer tie bar 22 and an inner tie bar 23. The straps 4 and 5 are frictionally held or secured to the tie bars 22 and 23 of corner members 8 and 9, respectively, in the following manner, as more clearly shown in FIG. 3 wherein strap 5 is being attached to corner member 9.

The free end of the strap 5 is threaded downwardly through the leading slot 19 and after passing beneath the tie bars 23 and 22 is threaded upwardly through the innermost slot 21. The threading of the strap is continued backwardly over the tie bars 22 and 23 and then around the forwardmost tie bar 23 by passing the strap downwardly through the leading slot 19 to define a loop 24 encircling the outer tie bar 23. The securement is completed by passing the strap upwardly through slot 20 and forward around the inner tie bar 22 defining an inner loop 25 encircling the tie bar 22 within an outer layer of the strap 5. The strap securement is completed by threading the end of the strap beneath the tie bars 22 and 23 and outwardly through the outer slot 19. To tighen the strap to the extension 14, both plies of the strap are grasped adjacent the free end of the strap 5 and pulled up tightly. Thereafter, a tension force exerted on the strap at the opposite end results in firm frictional engagement upon itself and to the extension 14 and prevents yield of the attachment under heavy pull on the strap 5. However, when it is desired to remove the straps 4 and 5 from the corner members 8 and 9, the opposite end is loosened to remove the tension on the strap and the strap unthreaded from the corresponding extension 14.

Referring particularly to FIG. 2, the strap 4 is shown to the left side of the bed 2 in the drawing. The strap 4 is secured to the extension 14 of corner member 8, as previously described, and extends to the left in FIG. 2 laterally across the top sheet 3. The strap 4 is threaded laterally beneath extension 14 of corner member 9 and through opening 16 and the U-shaped guide 17. The strap 4 then projects downwardly and is secured to the buckle 10 of fastener 6 adjacent the side of the stack of plywood sheets 3.

The corner member 8 is firmly secured in place by closing of the buckle 10 of fastener 6 and holds the stack of sheets 3 down and against lateral movement, as shown to the right in FIG. 2.

Strap 4 also bears on the corner member 9 and firmly holds the corner member on the corner of the load. The strap 5, shown to the right side of the bed 2 in FIG. 2, is similarly secured in the final position by the fastener 7 to the bed 2. The strap 5 extends upwardly and then laterally through the U-shaped guide 17 of the corner member 8. From beneath the guide 17 however, the strap 5 extends upwardly over the extension 14 of the corner member 8 as well as the end of the strap 4 which is secured to the latter corner member. The strap 5 then continues laterally across the load, superimposed over the strap 4, and terminates in the initial attachment to the extension 14 of corner member 9, as previously described.

The buckle 10 of the fastener 7 is then closed to draw the strap 5 tightly about the stack of sheets 3. The strap 5 also bears on corner member 8 and prevents movement of the corner member 8 from the corner of the sheets 3. Thus, the straps 4 and 5 interact with the opposite corner members 9 and 8 to securely prevent movement from the corners of the load and preventing shifting of the load in the laterally opposite directions.

If the stack of sheets 3 tends to shift in either direction during movement of the truck 1, the tension of straps 4 and 5 prevents any shifting. Referring particularly to FIG. 2, if either the complete load or the upper sheets 3 tends to shift to the left, the force is transmitted through the clamping corner member 9 to the strap 5 which prevents the movement. Similarly, if the stack tends to shift to the right as viewed in FIG. 2, the upper corner member 8 transmits the force to the strap 4 which absorbs the force and prevents the movement.

The illustrated embodiment of the invention employs corner members 8 and 9 constructed to permit overlapping of the straps 4 and 5 across the top of the sheets 3. This keeps the straps 4 and 5 in longitudinal alignment and thus free of longitudinal shifting and increases the effectiveness of the holding action of the individual strap means. Further, the overlapping straps 4 and 5 thus prevent the edges of the two straps from rubbing against each other due to air-generated flutter when the truck 1 is moving. The flutter frequency can be very substantial at high truck speeds and any appreciable edge engagement may result in rapid wearing of one strap or the other to a degree where the tension in the strap causes separation thereof.

As previously described, the present invention can be employed to tie down not only stackable items such as sheathing, metal sheets, paper sheets and magazines and the like but can also be applied to boxes or rolls of newsprint paper standing on one end. If the corner members are to be employed for newsprint rolls or the like, the vertical leg or wall is preferably curved to generally conform to the curvature of the newsprint roll.

The present invention thus provides a durable and reliable tie-down means preventing lateral shifting of the load and firmly holding of the load down to the supporting bed and is particularly adapted for vehicle mounted loads and the like.

The corner members of the present invention can be readily fabricated from a suitable strength sheet metal in a rapid and facile manner and thus are readily adapted to mass production techniques. The corner members and straps or the like can be readily attached and detached from the load and thus provide a very convenient means for loading and for tying down of cargo and other loads to a flatbed, pallet or any other suitable support.

Various modes of carrying out the present invention are contemplated as being within the scope of the following claims particularly pointing out and distinctly claiming the subject matter which is regarded as the invention.

I claim:

1. A tie-down assembly for securing a load having generally square top corner portions to a base, which comprises a pair of aligned flexible elongated members secured to the base immediately adjacent the load area of the base and of sufficient length to extend upwardly and over the top of the load, a pair of corner members disposed on the top corners of the load in alignment with said elongated members, each of said corner members including perpendicularly intersecting rigid legs engaging the side and top of the load, at least one of said corner members including a vertical offset portion on the rigid leg engaging the top of the load with an opening in the connection therebetween in alignment with the elongated member, the elongated member from the immediately adjacent side of the load passing over the corner member and through the opening to the opposite corner member, means to secure said last-named elongated member to the top engaging rigid leg of said opposite corner member, the other elongated member passing upwardly and over said opposite corner member in engagement with the side leg and the corner thereof to said vertical offset portion, and means to secure said other elongated member to said vertical offset portion.

2. A load tie-down assembly in combination with a vehicle flatbed for carrying a load of vertically stacked board-like members, a pair of flexible straps, a releasable strap connector secured on aligned opposite edge portions of the bed adjacent the load area for the load and releasably secured to one end of the straps, a pair of similar top corner members formed of a sheet metal and being L-shaped to define a side engaging leg and a top engaging leg respectively engaging the side and top of said load in alignment with the releasable strap connector, said corner member being wider than said straps and having a raised extension connected with the top engaging leg by a normal junction corner member portion and defining an opening slightly wider than said strap, an inverted U-shaped strap guide secured to the top engaging leg in alignment with said opening and with the upper surface generally below the upper edge of the opening, means carried by said extension releasably secured to the strap from the releasable strap connector on the opposite side of the load, each of said straps being similarly extended from the connector and through the strap guide of the immediately adjacent corner member, one of said straps extending through the opening in the adjacent corner member and laterally to the opposite corner member and being secured to the extension thereof, and the other strap extending from the strap guide upwardly and laterally over the adjacent corner member extension and the opposite strap and being secured to the corner member extension of the opposite top corner member.

3. A load tie-down assembly in combination with a flat bed for carrying a load, a pair of flexible straps, releasable strap connectors secured on aligned opposite edge portions of the bed adjacent the load area for the lumber and releasably secured to one end of the straps, a pair of similar L-shaped corner members defining a side engaging leg and a top engaging leg respectively engaging the side and top of said load in alignment with the releasable strap connector, said corner members being wider than said straps and having a raised parallel extension connected to the top engaging leg by normal junction corner member portions defining an opening slightly wider than said strap, one of said straps extending upwardly from one releasable strap connector in alignment with and passing horizontally through the aligned opening in the adjacent corner member and then laterally to the opposite corner member, the other of said pair of straps extending upwardly from the other strap connector and over the top of the corner member to bear on the latter and laterally to the corner member extension of the opposite L-shaped corner member, and means on each of said extensions for securing the ends of the straps thereto.

4. The tie-down assembly of claim 3 wherein said last-named means comprises a plurality of tie bars defined by lateral slots in the extension and the straps are secured thereto by overlapped threading about the tie bars to form a friction attachment thereto.

5. A load tie-down assembly in combination with a vehicle flat bed for carrying a load of vertically stacked generally flat members, a pair of flexible straps, a releasable strap connector secured on aligned opposite edge portions of the bed adjacent the load area for the members and releasably secured to one end of the straps, a pair of similar top corner members formed of a sheet metal and being L-shaped to define a side engaging wall and a top engaging wall respectively engaging the side and top of said load in alignment with the releasable strap connectors, said corner members being wider than said straps and having a raised wall extension integrally connected with the forward edge of the top engaging wall by normal junction portions defining an opening slightly wider than said strap, an inverted U-shaped strap guide secured to the top engaging wall in alignment with said opening and with the upper surface generally below the upper edge of the opening, an outer and an inner tie bar extending laterally within said corner member extension and formed by three parallel lateral slots, one of said straps extending upwardly from a releasable strap connector in alignment with and passing horizontally through the guide and aligned opening in the corresponding adjacent corner member to the opposite corner member and being secured thereto by threading the strap through the slots to form a double of the strap including a single loop encircling the outer tie bar and a double loop of the strap encircling the inner tie bar with double ply passing the outermost slot to securely lock the strap to the corresponding corner member, the other of said pair of straps extending upwardly from the other strap connector and through the guide of the adjacent top corner member and then upwardly and laterally over the corner member extension of the adjacent top corner member to the corner member extension of the opposite top corner member, and said strap being secured thereto in the same manner as the securement of the opposite strap to the opposite corner member.

6. A tie-down member for a stack of lumber or the like by a flexible elongated member, which comprises a pair of perpendicularly related rigid legs defining a corner engaging clamp surface, a parallel raised extension of one of said legs secured thereto by a pair of perpendicular side junction portions and defining an opening for passing a flexible elongated member over the rigid leg and beneath the extension, an inverted U-shaped guide strip secured to the top surface of the leg carrying said extension, and means to secure another flexible elongated member to said extension.

7. A tie-down member for a stack of lumber or the like, which comprises a pair of perpendicularly related walls defining corner engaging and clamp surfaces, said walls being integrally connected and formed of a heavy sheet metal, a parallel raised extension of one of said legs integrally secured thereto by a pair of perpendicular junction portions with an opening between the junction portions for passing a member over the clamping surface and beneath the extension, an inverted U-shaped guide secured to the top surface of the leg carrying said extension, and a pair of transverse tie bars formed in said raised extension by three spaced transverse slots.

8. A tie-down assembly for securing a load to a base and preventing lateral shifting of the load, comprising a pair of flexible tie-down members, a pair of bracket means one for each of said tie-down members and engaging opposite upper corners of the load, said bracket means including a vertical side wall engaging member and an interconnected top wall engaging member, means to secure one end of the corresponding flexible tie-down member to the top wall engaging member of the bracket, said flexible tie-down member extending laterally from the corresponding bracket means across the top of the load and downwardly on the opposite side of the load, each of the top wall engaging members of the bracket means including a raised portion to which the corresponding end of the flexible tie-down member is secured free of the load, the top wall engaging member of each bracket means being provided with an opening for threading of the opposite flexible tie-down member therethrough whereby each member overlies the other across the top of the load, and means to secure the free end of the flexible tie-down members to the base on the corresponding sides of the load with the members tightened to secure the load to the base.

References Cited in the file of this patent

UNITED STATES PATENTS

| | | |
|---|---|---|
| 968,455 | Eastabrook | Aug. 23, 1910 |
| 1,615,813 | Romine | Jan. 25, 1927 |
| 1,705,381 | Snyder | Mar. 12, 1929 |
| 1,897,138 | North | Feb. 14, 1933 |
| 2,353,017 | Denton | July 4, 1944 |
| 2,458,287 | Moon | Jan. 4, 1949 |